United States Patent [19]

Mitchell

[11] Patent Number: 5,731,025

[45] Date of Patent: Mar. 24, 1998

[54] METHOD AND COMPOSITION FOR INHIBITING DECOMPOSITION OF ASPARTAME

[76] Inventor: David C. Mitchell, 3594 Little Cottonwood La., Sandy, Utah 84092

[21] Appl. No.: 710,035

[22] Filed: Sep. 11, 1996

[51] Int. Cl.$^6$ .................................................. A23L 1/236
[52] U.S. Cl. ............................................ 426/548; 426/658
[58] Field of Search .................................. 426/548, 658, 426/549

[56] References Cited

U.S. PATENT DOCUMENTS

| | | |
|---|---|---|
| 2,782,123 | 2/1957 | Rubin ..................................... 426/549 |
| 3,642,491 | 2/1972 | Schlatter . |
| 4,337,278 | 6/1982 | Brog . |
| 4,446,164 | 5/1984 | Brog . |
| 4,704,288 | 11/1987 | Tsau et al. . |
| 5,110,612 | 5/1992 | Quarles et al. . |
| 5,127,956 | 7/1992 | Hansen et al. ........................ 127/42 |
| 5,254,174 | 10/1993 | Hansen et al. ........................ 127/53 |
| 5,523,107 | 6/1996 | Wallin . |

OTHER PUBLICATIONS

90(10):V0016 FSTA, Abstracting FR 2627065 A1, 1989.

Mazur, et al., Structure–Taste Relationships of Some Dipeptides, Journal of the American Chemical Society, 91:10, May 1969, pp. 2684–2691.

Murray, D.G., New Starch Hydrolysates Improve Product Formulation, Food Engineering Jun. 1969, vol. 41, No. 6, pp. 87–90.

Opperman et al., Effect of Aspartame on Phenylalanine Metabolism in the Monkey, Journal of Nutrition, 103, 1973, pp. 1460–1466.

Opperman et al, Metabolism of Aspartame in Monkeys, Journal of Nutrition, 103, 1973, pp. 1454–1459.

Cloninger et al., Aspartylphenylalanine methyl Ester: A Low Calorie Sweetener, Science, vol. 170, Feb. 1970, pp. 81–82.

Vinick et al., A Superior Synthesis of Aspartame, Tetrahedron Letters, vol. 23, No. 13, pp. 1315–1318, 1982.

Frye et al., Optimizing Texture of Reduced–Calorie Yellow Layer Cake, Cereal Chemistry, 69(3):338–343, 1992.

*Primary Examiner*—Leslie Wong
*Attorney, Agent, or Firm*—Thorpe, North & Western, LLP

[57] ABSTRACT

A heat stable aspartame based sweetening composition containing a major amount of aspartame with minor stabilizing amounts of manna and Jerusalem artichoke may be used to prepare baked goods, hot drinks and the like. Preferably the composition also contains minor amounts of one or more of stevioside, chicory and chitin. Baked products made using this composition have comparable bulking properties, texture and flavor as obtained using sucrose.

20 Claims, No Drawings

METHOD AND COMPOSITION FOR INHIBITING DECOMPOSITION OF ASPARTAME

FIELD OF THE INVENTION

This invention relates to a new and improved sugar substitute containing aspartame. More particularly, this invention relates to a combination of substances which when combined with aspartame cause a substantial increase in the heat stability of aspartame, especially in cooking or baking processes. Specifically, the invention provides a composition which contains aspartame and other substances which provide heat stability and texture, is sucrose free, has approximately 100–200 times the sweetness of cane sugar and does not decompose during a cooking or baking process.

BACKGROUND OF THE INVENTION

The use of low-caloric, non-nutritive sweetening agents to replace table or cane sugar (i.e. sucrose), referred to hereinafter as "sugar", is of great importance to diabetic and diet conscious individuals. This need has stimulated the search for artificial sweetening agents which may be used as sugar substitutes. The first artificial sweetener approved for general use was saccharin. Saccharin is remarkably sweeter than sugar, having a potency of 250 to 350 times the latter material, but it has the serious disadvantage of possessing a bitter aftertaste. Subsequently, the sweetening property of cyclohexylsulfamic acid (cyclamate) was discovered. Cyclamate substances are about 30 times as sweet as sugar but likewise have serious disadvantages.

More recently, Aspartame has become almost universally adopted as an Artificial sweetener. Aspartame (L-aspartyl-L-phenylalanine methyl ester) is a widely used sweetener in many beverages, frozen desserts and other products not subjected to sustained heating. Its preparation and use are described in U.S. Pat. Nos. 3,492,131 and 3,642,491. FDA regulations 21 C.F.R. 172.804(c)(3) provide that when aspartame is used as a sugar substitute for table use its label shall bear instructions "do not use in cooking or baking". This label warning is required by the FDA because aspartame was found to be unstable when heated. For example, aspartame will decompose in typical baking processes, e.g., making cookies, cakes, breads and the like, producing methyl alcohol and formaldehyde. The observed decomposition is catalyzed by heat or aqueous acid within the ranges typically encountered during baking.

A solution to the problem regarding decomposition of aspartame during cooking is proposed in U.S. Patent No. 4,704,288, by Josef H. Tsau (hereinafter "Tsau patent" or "Tsau"). The Tsau patent discloses the use of animal fats and oils to coat individual aspartame crystals so as to insulate them from the damaging effects of heat during the baking process. The invention is based on the knowledge that solid aspartame is significantly more stable than aspartame in solution. The Tsau patent concludes that coating aspartame particles with a compatible fat will prevent the aspartame from dissolving, thus stabilizing the aspartame during the baking process. The invention of the Tsau patent relies on the insulating ability of fats and oils to prevent the dissolution and subsequent heat catalyzed degradation of aspartame. The Tsau patent states: "An ideal coating is not only compatible with aspartame but also has a melting point of about 100° C. to release aspartame until the end of the baking cycle. However, a mechanism other than melting fat is needed to slow down the release of aspartame during baking." The Tsau patent finds that "a mechanism . . . to slow down the release of aspartame during baking . . . can be accomplished by increasing fat coating thickness" so as to increase the time required for the fat coating to melt and subsequent release of the aspartame into the cake matrix. The increased time needed for the melting of the fat likewise augments the duration of the protection provided by the fat to the aspartame molecule. The Tsau patent seems to conclude that by excluding aspartame from the degrading effects of a hot aqueous environment, both the goals of preventing degradation of aspartame and the exploitation of aspartame's sweetness are accomplished. This invention introduces a significant amount of fat into the formulation. This additional fat would be undesirable in a low-calorie, low-fat dietary formulation.

Because of the magnitude of sweetening power over sucrose provided by artificial sweeteners the actual amount of sweetener utilized, by weight, as compared to sucrose is minimal. However there are attributes provided by table sugar, such as bulking properties, which are not present in artificial sweeteners.

Diabetic and nutrition-conscious consumers have fueled the need and desire for sugar-free baking goods, but the replacement of sugar with the sugar-free substitutes and sugar derivatives, such as hydrolyzed starch carbohydrates, in baking foods has been a very formidable task. As pointed out by Frye, et al., Optimizing Texture of Reduced-Calorie Yellow Layer Cakes, Cereal Chemistry, 69(3), 338–343, the role of sucrose in cake formulations goes far beyond providing sweetness. Sucrose also retards and restricts gluten formation; increases the temperature of egg protein denaturation and starch gelatinization; contributes to bulk, volume and flavor retention; adds structural integrity; and provides sensory properties, e.g. textures, that have been impossible to replace except by substitution with fruit juices or other sugar-containing or sugar derivative-containing materials that include, for example, fructose, dextrose, and the like. Others have incorporated high potency sugar substitutes, such as aspartame, into frosted coating, for use on cereal flakes, toaster pastries, confections and sweetened snack foods (see U.S. Pat. No. 5,030,460). Others have included starch hydrolysates as glazings and icings for donuts and cakes (see Murray, New Starch Hydrolysates Improve Product Formulation, *Food Engineering*, June 1969, 87–90). Furthermore, others have used starch hydrolysates or maltodextrins as bulking agents in cake or batter formulations and/or as a total or partial replacement for sucrose, fat and/or oil (see U.S. Pat. No. 5,094,872).

In an attempt to achieve the bulking properties of sugars in baked goods some have advocated the incorporation of synthetic polymeric substances, such as polydextrose, as disclosed in U.S. Pat. No. 4,622,233. Polydextrose, however, has been found to leave a bitter aftertaste in baked goods.

Polyol blends have been used to replace sugar in the baked goods. U.S. Pat. No. 5,523,107. In brief, this patent discloses formulating an essentially sugar-free bakery good that is formed from a batter mixture that includes 15%–25% polyhydroxy oligomers by weight having the desired degree of polymerizability. The polymerizability is included to promote the bulking property normally associated with the use of sugar in sugar-based bakery goods. Although this invention discloses a technique whereby bulking properties similar to sugar are achieved, it has been done artificially through the addition and incorporation of oligomeric polyols to provide that degree of polymerization that simulates the desired property in baking goods while still maintaining them as sugar-free dietary foods.

Other bulking agents for replacement of sucrose are found in U.S. Pat. No. 5,110,612. This patent discloses the use of starch hydrolyzates, i.e. glucose polysaccharides, such as corn syrups, corn syrup solids and high fructose corn syrup to partially or completely replace sucrose in many food formulations. Starch hydrolyzate products provide a sweet taste almost on a par with sucrose but do not appreciably reduce the calorie content of the food product to which they have been added. All carbohydrates, whether starches, complex or simple sugars contain roughly four calories per gram. Starch hydrolyzate products as disclosed in the '612 patent, provide an amount of bulking property, but, fail to provide the bulking properties and sweetness which are demanded by both gourmet and household chefs. This patent further teaches that although high potency sweeteners such as aspartame and sodium saccharin can provide a low-calorie sugar replacement for food items they cannot provide the bulking and texture properties desired. The patent concludes that the bulking properties associated with sucrose are critical in providing the properties typically associated with baked goods, and as a replacement for sugar, only starch hydrolyzates (glucose polysaccharides) perform adequately.

Sucrose or table sugar is a disaccharide made up of one molecule of glucose (dextrose) and one molecule of fructose (fruit sugar).

It would be desirable, therefore, to provide an artificial sweetener or combination of sweeteners which solved the problems presented, namely, a sweetener which is non-heat labile and which simultaneously provides the bulking properties normally associated with the inclusion of table sugar in baking recipes.

OBJECTS AND SUMMARY OF THE INVENTION

It is an object of the present invention to provide an improved sweetener which simultaneously affords a sweetness which is significantly superior to glucose or glucose polymers and which can be included in bakery processes without substantial molecular degradation.

A further object of the invention is to provide a mixture which stabilizes aspartame at elevated temperatures without diminishing its sweetening powers.

An additional object of the invention is to provide a sugar substitute, derived from natural sources, which is substantially similar in bulking properties to table sugar with respect to baked foods.

A further object of the invention is to provide a mixture, containing aspartame, which is stable under conditions of heat, up to approximately 410° F. (210° C.), and which is also stable to acid within the pH ranges which are normally encountered in foods.

These and other objects may be accomplished by means of a composition consisting of a major proportion of aspartame to which has been added minor amounts of manna powder, particularly Australian manna powder and Jerusalem artichoke powder with or without optional minor amounts one more members selected from the group consisting of Stevia Rebaudiana extract, chicory and chitin to achieve a sweetening agent which is between 100 and 200 times sweeter than sugar and which is stable to heat and acid and therefore can be used in cooking sugar free items which retain the look, texture and sweetness of baked items utilizing sugar. The incorporation of said compounds when mixed together are co-stabilizing and allow for incorporation of aspartame into bakery goods and which provide the bulking properties desired as well as a reduced calorie content due to their enhanced sweetening potency. Furthermore, this combination of compounds provides for improved shelf-life and stability of aspartame. The heat stability of the mixture allows for the addition of aspartame into hot beverages, acidic drinks and foods to be baked, which was previously unavailable due to the instability of aspartame at higher temperatures and acidic or basic pH's.

DETAILED DESCRIPTION OF PREFERRED EMBODIMENTS

In the following description it is to be understood that, while the components making up the sweetening composition, are given in percent or parts by weight that is not to be interpreted as preventing other components, diluents, or other agents from being utilized concurrently. Therefore, it is the relative proportion of the stated ingredients to each other that provides the desired results.

At a minimum, the heat stable sweetening composition contains, on a dry weight basis, from 69 to 97 percent or parts by weight of aspartame; 1 to 10 percent or parts by weight of manna (preferably Australian manna powder) and 2 to 15 percent or parts by weight Jerusalem artichoke powder. In addition, the composition may one or more members selected from the group consisting of Stevioside or steviol, chicory and chitin. Such compositions can contain 0 to 2 percent or parts by weight of Stevioside or steviol, 0 to 3 percent or parts by weight chicory and 0 to 1 percent or parts by weight chitin. When Stevioside, chicory or chitin are present, the minimum amount will generally not be less than about 0.1 percent or parts by weight.

Thus, by way of example, if the composition contained 69% aspartame, 10% Austrian manna powder, 15% Jerusalem artichoke powder, 2% Stevioside, 3% chicory and 1% chitin there would be a 100% representation of ingredients. However, if equal parts by weight of the composition was to be blended with a dextrose filler, the relative proportion of the stated ingredients to each other would still be the same even though the total percent of each ingredient in the overall blend would be cut in half. However, such a composition would still be within the scope of the invention since the ingredients utilized to provide a heat stable aspartame would not be changed in their relative proportions to each other. In other word, it is only the stated ingredients to which the percentages or parts by weight designation is applicable.

Aspartame (N-L-α-aspartyl-L-phenylalanine 1-methyl ester) or 3-amino-N(α-carboxphenethyl)succinamic acid N-methyl ester is a dipeptide of aspartic acid and phenylalanine which is about 160 times sweeter than sucrose in aqueous solutions. It is a colorless solid having a melting point of 246°–247° C. Its preparation, metabolism, structure-taste relationship and other properties are well documented. Attention is specifically directed to U.S. Pat. No. 3,492,131; Davey, et al., *J. Chem. Soc.* 1966, 555; Pietsch, *Tetrahedron Letters* 1976, 4053; Vinick et al., *Tetrahedron Letters* 23, 1315 (1982) Mazur et al., *J. Am. Chem. Soc.*, 91, 2684.(1969); Cloninger et al, *Science*, 170, 81 (1970) and Oppermann et al., *J. Nutr.* 103, 1454, 1460 (1973).

Aspartame, with its sweetening power, will comprise the major proportion of the composition. As noted above, between about 69 to 97% of the composition, by weight, will be aspartame with a range of about 75 to 88% being preferred.

The two components which complement the aspartame and contribute primarily to its heat stability are manna and Jerusalem artichoke powders.

Manna (Australian manna powder) is the dried exudation of *Fraxinus ornus L., Oleaceae. Habit.* found in the Mediterranean Basin, Asia Minor and Spain. It is made up of about 40–60% mannitol, 10–16% mannotetrose, 6–16% mannotriose (e.g. raffinose); glucose, mucilage and fraxin. One gram dissolves in 5 mls of water. It is present in the sweetening composition in an amount of between about 1 and 10% by weight with a preferred range being between about 2 and 7% by weight.

Jerusalem artichoke, also known as topinambur, is the subterranean stem tuber of *Helianthus tuberosus L. Compositae*, a kind of sunflower native to North America. It contains up to 30% by weight (wet basis) of polysaccharides such as raffinose and stachyose usable as sweetening agents. See U.S. Pat. No. 2,782,123. It is present in the sweetening composition in ranges of between about 2 to 15% by weight with a range of between about 5 and 9% being preferable.

Stevioside, or steviosin is a non-nutritive sweetener about 300 times sweeter than sucrose. Chemically it is 13-[(2-O-β-D-Glucopyranosyl-α-D-glucopyranosyl)oxy]kaur-16-en-18-oic acid β-D-glucopyranosyl ester. It is an isolate from the leaves of *Stevia rebaudiana* or *yerba dulce* found in Paraguay. Steviol is an aglucon of stevioside obtained by enzymatic hydrolysis. It is identified as 13-Hydroxykaur-16-en-18-oic acid. This substance can be present in amounts ranging between about 0 and 2% by weight, with a broad range being about 0.1 to 2% by weight and a preferred range being about 0.1 to 1.5% by weight.

Chicory is an herb, flavor enhancer and stabilizer containing many components including, but not limited to, lactucin, intybin, inulin, tannins, chicorin, esculin and fraxin. Many of these are saccharides or saccharide derivatives. Others are furanone or pyranones. Combinations of saccharide and furanone or pyranones, such as fraxin are particularly useful in the present invention. It may be present in the composition in amounts of between about 0 and 3% by weight with a broad range being between about 0.1 and 3% by weight. A preferred range of chicory is between about 0.1 and 2.7% by weight.

Chitin is a cellulose-like biopolymer consisting predominantly of unbranched chains of β-(1→4)-2-acetamido-2-deoxy-D-glucose or N-acetyl-D-glucosamine residues. It is found in fungi, yeasts, marine invertebrates and arthropods. It is a derivative of cellulose in which the C-2 hydroxy groups have been replaced by acetamido residues. Deacylated chitin, chitosan, may also be utilized. Only minor amounts of chitin are needed. From 0 to 1% by weight may present with a broad range being between about 0.1 to 1% and a preferred range being between about 0.1 to 0.7% by weight.

The present invention encompasses a mixture of compounds which interact synergistically at elevated temperatures regardless of solvation to protect and stabilize the important functional groups of aspartame and similar sweeteners. Although the exact chemical mechanism whereby the functional groups of aspartame are protected is unknown, the observable result of maintenance of the aspartame structure throughout baking is apparent.

The sweetening composition components, other than aspartame, is a complex mixture of polysaccharides and/or hydroxy coumarin glucosides or combinations of both. The coumarin derivatives are all capable of bioflavonoid activity. The bioflavonoid activities work to protect sweeteners such as aspartame from hydrolysis into its component aspartic acid and phenylalanine methyl ester in acid media. The method of action may be due to the coumarin molecule's ability to absorb an $H_2O$ molecule and undergo ring opening. The method of protection provided by the molecule may be similar to citrus bioflavonoids in the animal and human body protecting veins and arteries from undergoing hydrolytic degradation. Typically the bioflavonoids protect subendothelial cell walls of veins and arteries from undergoing hydrolysis damage. The coumarin compounds in the present invention present an analogous function. The compounds found in the composition serve to protect the functional groups, which are largely responsible for the sweetness of aspartame, from degradation.

The methylcarboxylate group of the aspartame is first to undergo oxidation or hydrolysis. The methylcarboxylate group becomes unstable under acidic conditions regardless of temperature. The coumarin glucosides when present act as an energy-absorbent and oxidation-preventing agent. The coumarin glucosides are themselves reduced during baking. For example, raffinose melts with subsequent loss of water at 80° C. thus preventing a large portion of the energy from being absorbed into aspartame. Upon decomposition at 112° C., raffinose separates into galactose, glucose and fructose, this results in several new components in the mixture which effectively surround and protect the aspartame molecule from the degrading effects of the heat.

The second functional group of aspartame which must be protected is the amide group. The amide group becomes unstable as a result of acid hydrolysis at ordinary temperatures over extended periods of time. However, at elevated temperatures, the decomposition is enhanced. The coumarin glucosides and the decomposed raffinose's, i.e. galactose, glucose and fructose protect the amide groups of aspartame in the current invention above 112° C., (234° F.). At approximately 295° F. the stachyose decomposes to produce additional fructose and galactose. The fructose is rapidly decomposed into sorbitol and sorbose. The decomposition of fructose at this elevated temperature provides for additional absorption of the oxidative energy. The absorption of this energy prevents the decomposition of aspartame as the energy has been utilized to decompose more easily decomposable compounds. Inulin, as found in chicory, decomposes at 140° C. (284° F.) into fructose and glucose. In similar fashion the fructose is further decomposed into sorbitol and sorbose absorbing significant additional amounts of oxidative energy. The present invention prevents the destruction of aspartame during the baking process by channeling substantial amounts of energy into the degradation and alteration of other complex additives.

The third functional group, the ethylene group, is a structural backbone of the aspartame molecule. The destruction of the ethylene group at high temperatures, i.e. above 200° F. causes a total loss of sweetness. In a similar manner to previous presented mechanisms, the alteration and decomposition of some of the additives in the current invention provide a protecting mechanism during heating of this essential ethylene group. The mechanism of protection above 295° F., is a mixture of chalcones, sorbitols, sorboses and mannitols which do not begin to decompose until 295° C. (563° F.), whereas aspartame is completely destroyed at 246° C. (475° F.). Also the hydroxylated intybin (as obtained from chicory) together with the aspartame, galactose, fructose, sorbose and glucose form a stevioside type complex. The chicory and the tannin sub-unit may form a complex with the glucose, sorbose, sorbitol, fructose, galactose and mannitol which surround and attach to the aspartame forming again a stevioside-like sweetener. Importantly, stevioside and similar mixtures of sorbitol, sorbose and mannitol do not become unstable until 296° C. (563° F.), which is typically beyond the temperature of most baking processes.

To illustrate functional embodiments of the invention, the following examples are given. It is to be understood, however, that the examples are given in the way of illustration and are not to be regarded as limiting the scope of the invention in any way.

By way of summary, the invention is a mixture of the following components each of which may be present in various amounts or ranges. Each component named may be a complex mixture but is employed as the substance by that name is defined in the 10th edition of The Merck Index. The components and broad and preferred ranges in terms of percent by weight are as follows:

| Component | Broad | Preferred |
| --- | --- | --- |
| aspartame, | 69%–97% | 76%–88%. |
| Jerusalem artichoke, | 2%–15% | 5%–9% |
| manna, | 1%–10% | 2%–7% |
| chicory, | 0%–3% | 0.1%–2.7% |
| chitin, | 0%–1% | 0.1%–0.7% |
| Stevioside or steviol | 0%–2% | 0.1%–1.5% |

The following examples are representative of sweetening compositions which might be utilized as sugar substitutes, particularly in baked goods.

EXAMPLE 1

100 grams of improved sweetener is prepared as follows:

5 grams manna powder 5 grams Jerusalem artichoke powder 1 gram stevioside 1 gram chitin 88 grams aspartame.

The solids are combined as powders and mixed until a homogeneous composition is formed. The overall sweetness is 170 times greater than natural cane sugar. The formula is heat stable up to 200° C. (392° F.), where aspartame normally decomposes, and is acid stable where aspartame likewise slowly decomposes. The above formula is an improvement in flavor stability and sweetness over the use of unprotected aspartame. This formulation is useful in making baked foods such as cakes, cookies and the like and provides bulking properties and texture similar to that when sucrose is used as the sweetener.

EXAMPLE 2

100 grams of improved sweetener is prepared as follows:

10.0 grams manna powder 2.0 grams Jerusalem artichoke powder 0.5 gram chitin 87.5 grams aspartame.

The solids are combined as powders and mixed until a homogeneous composition is formed. The overall sweetness is 165 times greater than natural cane sugar. The formula is heat and acid stable up to 190° C. (374° F.), and normal baking pH. The sweetener of this example is used as a replacement for sugar in baked goods and provides comparable bulking and texture properties.

EXAMPLE 3

100 grams of improved sweetener is prepared as follows:

3.0 grams manna powder 7.0 grams Jerusalem artichoke powder 1.5 grams steviosides or steviol 0.5 grams chitin 88.0 grams aspartame.

The solids are combined as powders and mixed until a homogeneous composition is formed. The overall sweetness of the composition is 170 times sweeter than sugar. The formula is non-heat sensitive up to 190° C. (374° F.) and is acid stable. The formulation of this example provides a sweetener which replaces unprotected aspartame and sugar. The formulation provides for the bulking properties associated with the use of sugar in baking, the reduced caloric content desired and the safety which is lacking in the use of unprotected aspartame in baking.

EXAMPLE 4

100 grams of improved sweetener is prepared as follows:

2.8 grams manna powder 4.6 grams Jerusalem artichoke powder 0.05 grams chestnut powder 0.24 grams chitin 50.0 grams dextrin 1.5 grams chicory powder.

40.81 grams aspartame

In each of the examples the improved sweetener has a shelf-life of 9–12 months. The improved sweetener eliminates aqueous and acidic media decomposition thereby eliminating the toxicity normally accompanying the use of unprotected aspartame in analogous situations.

The above description and examples may be modified to produce a variety of imitation sweeteners which come within the scope of the invention. The invention is limited in scope only by the appended claims.

What is claimed is:

1. A heat stable aspartame based sweetening composition comprising a major amount by weight of aspartame, minor amounts by weight of manna and Jerusalem artichoke and of between about 0% to 2% by weight of stevioside, of between about 0% to 3% chicory and of between about 0% to 1% chitin.

2. The sweetening composition according to claim 1 comprising about 69 to 97 percent by weight aspartame, 1 to 10 percent by weight manna, 2 to 15 percent by weight Jerusalem artichoke; 0 to 2 percent by weight stevioside; 0 to 3 percent by weight chicory and 0 to 1 percent by weight chitin.

3. The sweetening composition according to claim 2 comprising about 69 to 97 percent by weight aspartame, 1 to 10 percent by weight manna, 2 to 15 percent by weight Jerusalem artichoke and at least one member selected from the group consisting of stevioside, chicory and chitin wherein said member or members present is present in an amount of at least 0.1 percent by weight.

4. The sweetening composition according to claim 3 wherein said member is stevioside.

5. The sweetening composition according to claim 3 wherein said member is chicory.

6. The sweetening composition according to claim 3 wherein said member is chitin.

7. The sweetening composition according to claim 3 wherein said members are stevioside and chicory.

8. The sweetening composition according to claim 3 wherein said members are stevioside and chitin.

9. The sweetening composition according to claim 3 wherein said members are chicory and chitin.

10. The sweetening composition according to claim 3 wherein said members are stevioside, chicory and chitin.

11. The sweetening composition according to claim 2 comprising about 76 to 88 percent by weight aspartame, 2 to 7 percent by weight manna, 6 to 9 percent by weight Jerusalem artichoke and at least one member selected from the group consisting of stevioside, chicory and chitin wherein said member or members present is present in an amount of at least 0.1 percent by weight.

12. The sweetening composition according to claim 11 wherein said member is stevioside which is present in an amount of between 0.1 and 1.5% by weight.

13. The sweetening composition according to claim 11 wherein said member is chicory which is present in an amount of between 0.1 and 2.7% by weight.

14. The sweetening composition according to claim 11 wherein said member is chitin which is present in an amount of between 0.1 and 0.7% by weight.

15. The sweetening composition according to claim 11 wherein said members are stevioside and chicory which are present in amounts of between about 0.1 and 1.5% and 0.1 and 2.7% by weight respectively.

16. The sweetening composition according to claim 11 wherein said member are stevioside and chitin which are present in amounts of between about 0.1 and 1.5% and 0.1 and 0.7% by weight respectively.

17. The sweetening composition according to claim 11 wherein said members are chicory and chitin which are present in amounts of between about 0.1 and 2.7% and 0.1 and 0.7% by weight respectively.

18. The sweetening composition according to claim 11 wherein said members are stevioside, chicory and chitin which are present in amounts of between 0.1 and 1.5%, 0.1 and 2.7% and 0.1 and 0.7% by weight respectively.

19. Baked goods sweetened by the composition of claim 2 having bulking and texture properties comparable to baked goods sweetened by sucrose.

20. Baked goods sweetened by the composition of claim 3 having bulking and texture properties comparable to baked goods sweetened by sucrose.

* * * * *